United States Patent [19]

Edwards

[11] Patent Number: 5,062,148

[45] Date of Patent: Oct. 29, 1991

[54] MULTI-PATH FADING SIMULATOR

[75] Inventor: Allen P. Edwards, Palo Alto, Calif.

[73] Assignee: Hewlett-Packard Company, Palo Alto, Calif.

[21] Appl. No.: 360,650

[22] Filed: Jun. 2, 1989

[51] Int. Cl.$^5$ .................. H04B 1/10; H04B 15/00
[52] U.S. Cl. ........................ 455/52; 455/65; 455/304
[58] Field of Search ............... 455/10, 52, 63, 65, 455/67, 303, 304

[56] References Cited

U.S. PATENT DOCUMENTS

| | | | |
|---|---|---|---|
| 4,090,137 | 5/1978 | Somo et al. | 455/63 |
| 4,466,133 | 8/1984 | Price | 455/303 |
| 4,490,830 | 12/1984 | Kai et al. | 455/101 |
| 4,669,091 | 5/1987 | Nossen | 455/65 |
| 4,679,248 | 7/1987 | McKeown | 455/65 |
| 4,710,975 | 12/1987 | Okamoto et al. | 455/304 |

OTHER PUBLICATIONS

*Measurements for Telecommunication Transmission Systems*—MTTS 85, Conference Publication No. 266.

Primary Examiner—Curtis Kuntz
Assistant Examiner—Lisa Charouel

[57] ABSTRACT

In accordance with the teachings of this invention, a multi-path distortion simulator is constructed having two paths, one path including a delay means, and both paths including phase shifters and attenuators. The phase shifters are closely matched, thereby compensating for drift and errors in the phase shifters. Similarly, the attenuators are closely matched, thereby compensating for drift and errors in the attenuators.

10 Claims, 4 Drawing Sheets

MULTI-PATH FADING SIMULATOR

BACKGROUND

This invention pertains to electronic test instruments and more specifically to a test instrument suitable for measuring performance of microwave radio receivers.

Radio systems are becoming considerably more complex in an attempt to utilize radio spectrum more efficiently. For example, multi-level modulation techniques such as 64Q AM utilize quadrature modulation (i.e. modulation of both the carrier frequency and phase) to provide a number of discrete states representing binary data. 64QAM provides 64 such discrete modulation states;256QAM provides 256 discrete modulation states. While more sophisticated modulation techniques allow more efficient use of the radio spectrum, sophisticated modulation techniques are, unfortunately, more sensitive to the effects of noise and other propagation errors.

The error performance standards imposed on radio equipment is specified by the CCITT and CCIR. Such performance standards define reception "outage" limits, i.e. error limits beyond which a receiver is considered to be out of service, i.e. not properly receiving the incoming signal.

W. D. Rummler has characterized multi-path fade mathematically as:

$$H(jw) = a[1 - B\ e^{-j(w-w_0)t}];\ \text{where} \tag{1}$$

$B = -20\ \log(1-b)$, the notch depth in dB;
$A = -20\ \log(a)$, the fade in dB;
$A + B =$ the total fade at the minimum response;
$t =$ a delay term ($t > 0$ for minimum phase, $t < 0$ for non-minimum phase with minimum and non-minimum phase as defined in network theory);.
$w =$ is the frequency; and
$w_0 =$ the notch center frequency FIG. 1 is a plot of the signature or "M curve" of a typical microwave receiver. The horizontal axis depicts frequency, with a center frequency at $f_0$. The vertical axis depicts notch depth, in decibels, required to produce a specified error ratio, for example $10^{-3}$.

Points located within the signature (i.e. inside the M curve) correspond to a receiver data error ratio greater than the specified error limit, and therefore represent the outage region of the receiver. The use of signature plots or M curves, as shown in FIG. 1, allow microwave receivers to be characterized, and thus compared for relative merit.

It is well known that multi-path fading, a major contributor to microwave radio receiver error rates, is dynamic in nature and thus a proper signal analysis should simulate dynamic multi-path fading in order to properly characterize the microwave radio equipment.

One prior art technique for simulating multi-path fading is shown in the block diagram of FIG. 2. A microwave radio signal is applied to input terminal 21, and then split into two paths utilizing splitter 22. Path 23a includes time delay element 24, phase shifter 25, and attenuator 26. Path 23b includes only attenuator 27. The output signals from paths 23a and 23b are combined in combiner 28, providing a microwave output signal on output terminal 29 which includes multi-path distortion since the input microwave signal has traveled over two separate paths just as a microwave radio in the atmosphere may travel over two paths, e.g. a direct antenna-to-antenna link and a link between antenna-to-antenna which reflects off of the earth's surface.

One disadvantage of the structure of FIG. 2 is that it operates at microwave frequencies, and thus is expensive, cumbersome, and difficult to accurately adjust. It is particularly difficult to accurately generate notches at microwave frequencies of desired frequency and depth. This, of course, adversely affects the the accuracy of the simulation.

Another prior art technique for performing signature analysis of microwave radios uses the intermediate frequency (IF) signal corresponding to a received microwave signal undergoing multi-path distortion. This IF signal from the microwave radio under test is given simulated multi-path distortion and then injected into the IF signal path of a microwave receiver, and the error analysis performed in order to obtain the signature curve. This technique obviates the problems of generating a multi-path distortion simulation signal at microwave frequencies. It is, of course, considerably easier to provide notches of desired and accurate frequencies and depths at an intermediate frequency of, for example, 70 or 140 MHz, as compared with providing notches of accurate frequency and depth at microwave frequencies.

One example of such an intermediate frequency multi-path distortion simulator for the purpose of this signature measurement of microwave equipment is described by Richman, "Automated Signature Measurement of Operational Microwave Radio-Relay Equipment Using a Novel Multi-Path Simulator", IEEE International Conference on Measurements for Telecommunication Transmission Systems-MTTS 85, Conference Publication No 266, pages 108-111. Such IF simulators can take a form of the microwave simulator shown in FIG. 2, with of course RF components operating at the IF frequency substituted for the microwave components described with regard to FIG. 2.

Alternatively, a structure as shown in FIG. 3 is used in the prior art in which path 33a includes phase shifter 35 and attenuator 36 for phase shifting and attenuating the input signal received on input terminal 31, and in which path 33b includes delay means 347 for delaying the input IF signal. The output signals from paths 33a and 33b are combined to provide an output IF signal on output terminal 39 which simulates multi-path fading.

Both of these prior art techniques for providing a multi-path simulation signal at IF radio frequencies are subject to significant drift and instability problems over time and temperature changes, making frequent calibration a necessary requirement. More specifically, the circuits which control the phase shifters and attenuators are very sensitive to temperature. For example, for a desired 40 dB notch depth to be accurate within a desired 1 dB, the attenuation must be very close as shown in Table 1, where B and b are defined in equation (1).

TABLE 1

| | Error for 1 dB Notch Depth | | |
|---|---|---|---|
| Depth B | b in dB | 1 dB error | .1 dB error |
| −10 dB | −3.302 | .46 dB | .046 dB |
| −20 | −.915 | .11 | .011 |
| −30 | −.279 | .033 | .003 |
| −40 | −.087 | .010 | .001 |
| −50 | −.028 | | |
| −60 | −.009 | | |
| −70 | −.003 | | |
| −80 | −.001 | | |

In other words, in order to hold a 40 dB notch to within 1 dB, the circuit must be sufficiently stable to cancel the two signals from paths 33a and 33b (FIG. 3) to 60 dB (i.e. a 40 dB notch held to 1 dB error corresponds to b=0.10 db, which is approximately equal to b=0.009 dB for a 60 dB notch depth. This serves as an example of the magnitude of the stability required to provide accurage notch depth. Similar problems exist in holding the center frequency of the notch, as determined by the delay and phase shift to the desired frequency, as shown in Table 2.

TABLE 2

| Error for 100 KHz Notch Frequency Error | | |
|---|---|---|
| Frequency | total-phase | 0.1 MHz error |
| 40 MHz | 89.3 degrees | .23 degrees |
| 50 | 66.6 | .23 |
| 60 | 43.9 | .23 |
| 70 | 21.0 | .23 |
| 80 | −1.4 | .23 |
| 90 | −24 | .23 |
| 100 | −47 | .23 |

Prior art such as described by Richman, cited above, uses a similar circuit where the phase shifter and attenuator are perhaps combined. Richman's circuit injects a test signal and the notch center frequency and depth are adjusted to null out the injected test signal as measured with a detector at the output. An appropriate amount of signal is then added back from the desired channel to bring the level at the notch bottom up to the required level, using a comparison loop with a precision attenuator.

Feedback loops hold the notch frequency and depth to the required precision. Two problems with Richman's circuit are: the obvious addition of complexity and cost, and the fact that the the circuit has a test signal that is in the band of the desired input signals. The feedback loop will thus react in an undesirable way with the input signals so as to act other than as a passive transfer function. In addition, the proper operation of the system requires the presence of a particular type of signal on the input so that other signals will not work. One particular type of signal that will not work is that provided by a network analyzer, so that the performance of the circuit is not easily tested, thereby adding to the cost of production and testing the multi-path simulator.

SUMMARY

In accordance with the teachings of this invention, a multi-path distortion simulator is constructed having two paths, one path including a delay means, and both paths including phase shifters and attenuators. The phase shifters are closely matched, thereby compensating for drift and errors in the phase shifters. Similarly, the attenuators are closely matched, thereby compensating for drift and errors in the attenuators.

DETAILED DESCRIPTION

The present invention provides a means for implementing an IF multi-path fading simulator that implements the Rummler model for multi-path fading. The present invention is specifically directed to generation of the B term of equation (1), as generation of the A term is relatively straight-forward.

Figure 1:
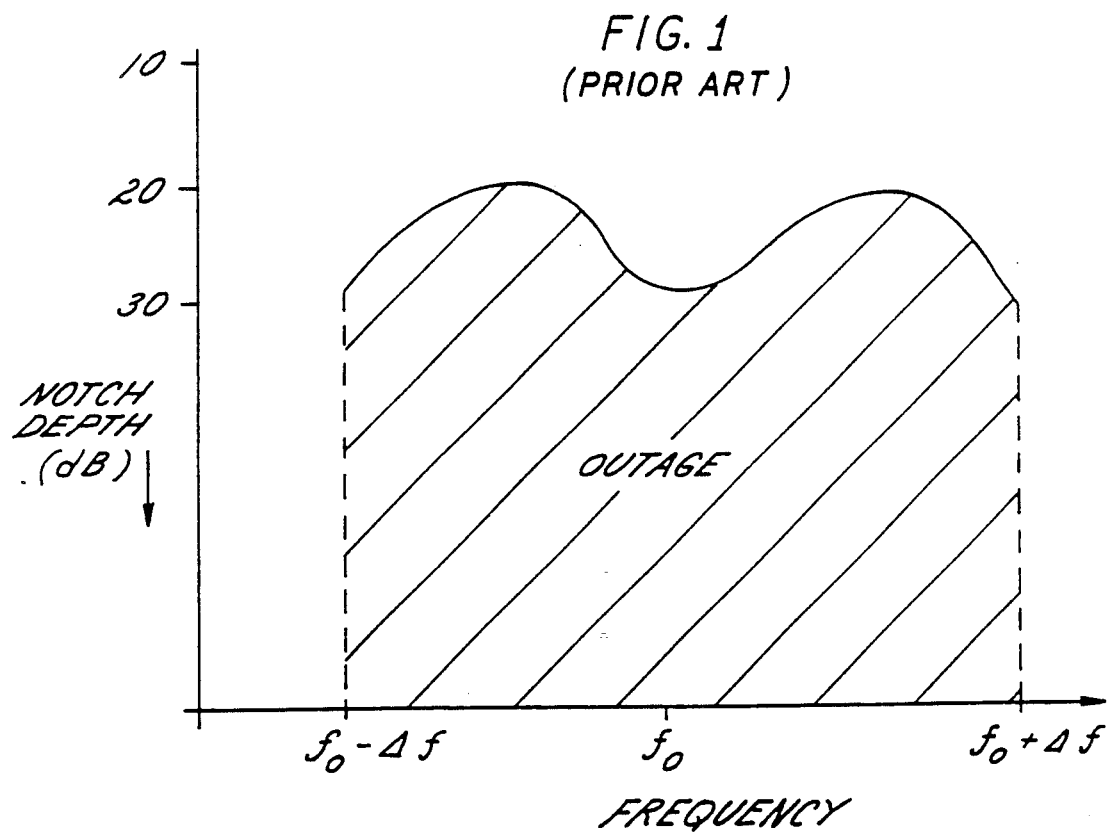
FIG. 1 is a graph of an M curve depicting outage in a radio receiver as a function of notch depth and frequency.
Figure 2:
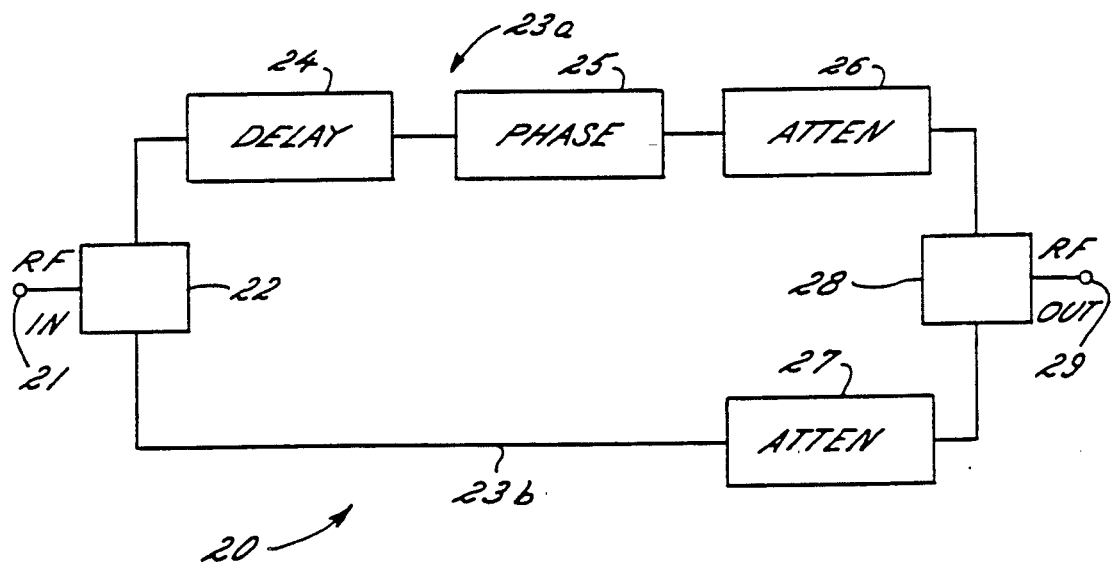
FIG. 2 is a block diagram of a prior art multi-path fading simulator.
Figure 3:
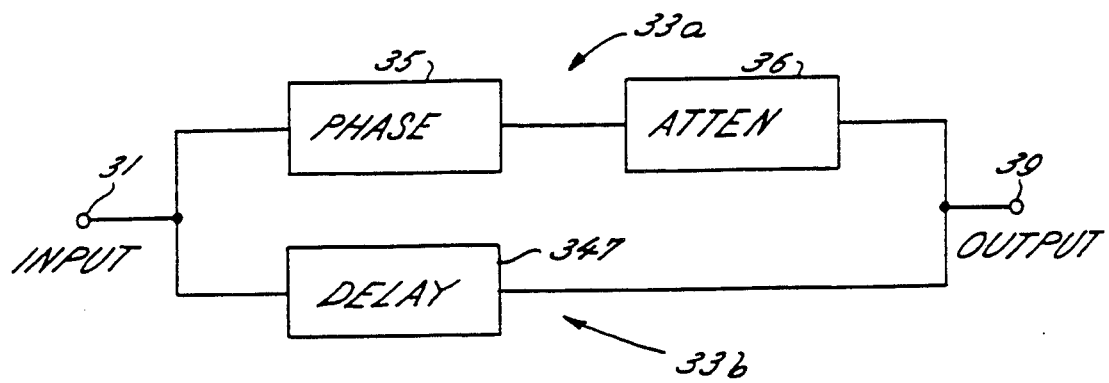
FIG. 3 is a block diagram of another prior art multi-path fading simulator.
Figure 4:
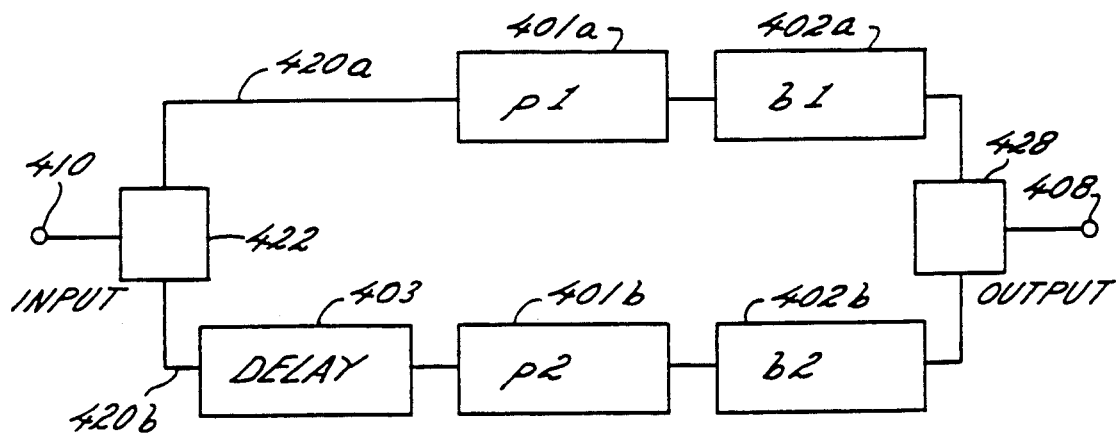
FIG. 4 is a block diagram depicting one embodiment of a multi-path fading simulator constructed in accordance with the teachings of this invention.

FIG. 4 is a block diagram of one embodiment of an IF multi-path fading simulator constructed in accordance with the teachings of this invention. Simulator 40 includes input terminal 410 for receiving a modulated IF signal, such as a 64QAM or a 256QAM signal modulated with test data, from the IF section of the microwave radio receiver under test (not shown). The input signal from input terminal 410 is split by power splitter 422 to provide signals to paths 420a and 420b. Path 420a includes phase shifter 401a providing a phase shift p1 and attenuator 402a providing a attenuator b1. Path 420b includes delay means 403 for providing a time delay, phase shifter 401b for providing a phase shift p2, and attenuator 402b providing attenuator b2. The signals from paths 420a and 420b are combined by combiner 428 and provide an IF output signal on output terminal 408 which includes multi-path fading information.

The delay provided by delay means 403 is, in one embodiment, fixed at an industry standard 6.3 nS. As will be readily appreciated by those of ordinary skill in the art in light of the teachings of this specification, other responses for other delays can be obtained with the 6.3 nS delay provided by delay means 403 by changing the B and A parameters of the model (equation 1). In accordance with the teachings of this invention, the required phase shift is split between phase shift p1 provided by phase shifter 401a in path 420a and phase shift p2 provided by phase shifter 401b in path 420b. Thus, phase shifters 401a and 401b each are required to provide only half of the total phase shift, with each providing phase shifts in a different direction so that the total phase difference is equal to twice the phase shift provided by either phase shifter 401a or 401b. In a similar manner, attenuators 402a and 402b are utilized to provide the total attenuation necessary, except one is used for minimum phase and the other is used for non-minimum phase. In other words, when the delayed signal from path 420b is of less amplitude than the direct signal from path 420a, a minimum phase response is produced. Conversely, when the delayed signal from path 420b has a greater amplitude than the direct signal from path 420a, a non-minimum phase response is produced.

Of particular importance, in accordance with the teachings of this invention, the use of two phase shifters 401a and 401b, one in signal path 420a and one in signal path 420b, provides that the drifts and errors in components used to construct the phase shifters will affect phase shifters 401a and 401b in a similar manner, and thus affect phase shift p1 and phase shift p2 in the same manner, and thus will cancel with substantially no change in the overall phase shift. Total phase shift P is defined as $$P = p1 - p2.$$

Let $$p1 = N + \Delta P,$$

and $$p2 = N - \Delta P;$$

where

N = the nominal offset phase shift of phase shifters 401a and 401b.

Then let p1 drift to p1+D. Since phase shifters 401a and 401b are matched, then p2 will drift to p2+D. Then $$p1 = N + \Delta P + D$$

and $$p2 = N - \Delta P + D$$

Then $$p = (p1 - p2) = 2\Delta P, \text{ as desired}$$

Similarly, in accordance with the teachings of this invention, two attenuators 402a and 402b, one in signal path 420a and one in signal path 420b, provides that the drifts and errors in components used to construct the attenuators will affect attenuators 402a and 402b in a similar manner and thus substantially cancel any change in the overall attenuation due to drift and error. Since total attenuation B is defined as $$B = b1 - b2$$

Then let b1 drift to b1+Δb. Since attenuators 402a and 402b are matched, then b2 drifts to b2+Δb. Then, since $$B = (b1 - b2)$$

$$B = (b1 + \Delta b) - (b2 + \Delta b)$$

and thus $$B = b1 - b2, \text{ as desired.}$$

Thus, in accordance with the teachings of this invention, a significant reduction is provided in stability over temperature variations. In practice, this reduction is greater than an order of magnitude.

The natural center frequency $f_0$ of circuit 40 is 1/(2*delay) or 79 MHz for a delay of 6.3 NS. In one embodiment, the desired frequency of operation is 40 MHz to 100 MHz. The frequency of phase shifters 401a and 401b is adjusted from 79 MHz to either 40 MHz or 1000 MHz by increasing or decreasing the phase difference provided between paths 420a and 420b.

For example, at 40 MHz the total path phase shift is 180 degrees for maximum cancellation. 40 MHz corresponds to a 360 degree period of 25 nS. The desired 180 degrees thus corresponds to 12.5 nS. Subtracting the 6.3 nS delay provided by delay means 403 in one embodiment of this invention leaves 6.2 nS, which corresponds to 89.3 degrees. If n is the nominal phase shift provided by phase shifters p1 and p2, then p1 is set to +(n−44.6) degrees, and p2 is set to −(n+44.6) degrees so that p1−p2 equals the required 89.3 degrees, with the nominal phase shift n of phase shifters 401a and 401b canceling. 6.3 nS is not the only delay that would work but is a preferred delay, since a phase shift of 6.3 nS is within the range of phase shifts easily provided by well-known phase shifters.

In one embodiment of this invention, phase shifters 401a and 401b of FIG. 4 are constructed as disclosed in now U.S. Pat. No. 4,978,931, filed June 8, 1989 on an invention of Carp and Edwards entitled Tunable Phase Shifter Having Wide Instantaneous Bandwidth, and assigned Hewlett-Packard Co.

Figure 5:
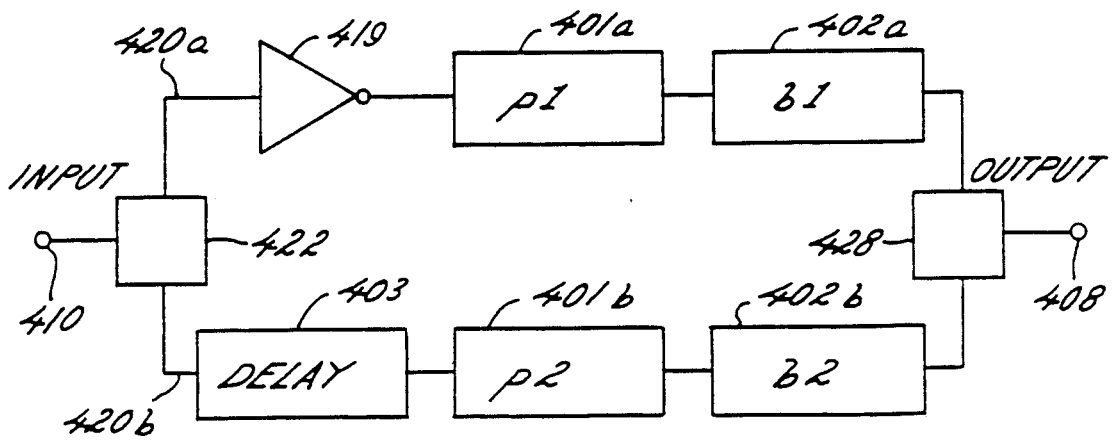
FIG. 5 is a block diagram depicting another embodiment of a multi-path fading simulator constructed in accordance with the teachings of this invention.

Another IF frequency of interest is 140 MHz. For this frequency, an inversion is placed in one signal path (for example, by inverter 419a placed in signal path 420a, as shown in FIG. 5) so that the natural frequency for cancellation is now 158.8 MHz (the frequency where the 6.3 nsec delay of delay means 403 gives 360 degrees of phase shift), which is within the desired band of 140±40 MHz. The delay could be adjusted to center these natural frequencies at the center of the band and adjustments made to the B and A parameters of equation (1) without loss of performance.

In an alternative embodiment of this invention, 0° splitter 422 and inverter 419 of FIG. 5 are replaced by a 180° splitter.

In one embodiment of this invention, a calibration algorithm is utilized which allows simple and accurate calibration of the circuit of this invention. In order for the notch depth to be maintained across a frequency range, the difference in signal levels between paths 420a and 420b must be held to great precision. To accomplish this, there must be an adjustment of the B parameters as the frequency of the notch is changed. In one embodiment, this is achieved by using a table of values for the settings of the attenuation vs. desired frequency and notch depth. In one embodiment, one table is used for minimum phase and another is used for non-minimum phase, as in one condition the b1 attenuation value provided by attenuator 402a in signal path 420a controls the notch depth and in the other condition the b2 attenuation value provided by attenuator 402b is signal path 420b controls the notch depth.

In one embodiment, the calibration algorithm uses a first of the attenuators to compensate for frequency response and the second of the attenuators to set the depth of the notch independently of the frequency. Which one of attenuators 402a and 402b (FIG. 4) serves which function is determined by whether minimum or non-minimum phase has been selected. The first (frequency response) attenuator is calibrated to provide a fixed amplitude output signal for any desired frequency. The second (notch depth) attenuator is calibrated for notch depth vs. attenuator setting at a fixed notch frequency. In operation, the second (notch depth) attenuator is first set to provide an output signal at a fixed reference level (e.g. an 80 dB notch depth) at a reference frequency. The desired frequency of the notch is then selected, using the phase shifters as described above. Next, the first (frequency response) attenuator is adjusted vs. notch frequency to maintain the output signal at the reference level, but at the desired notch frequency, thereby effectively cancelling the mismatch of gains of signal paths 420a and 420b vs. frequency, and allowing mismatch cancellation without regard to the desired notch depth. At this time, the first (notch depth) attenuator is then used to set the notch depth without consideration of the notch frequency.

In this embodiment, the reference notch depth of 80 dB is selected to hold any error from calibration to less than 0.1 dB at a 40 dB notch (see Table 1). For minimum phase, referring to FIG. 4, b2 of attenuator 402b is used to adjust for notch depth and b1 from attenuator 402a is used to compensate the frequency response, i.e. cancel out any frequency shift due to the aforementioned adjustment of b2. For non-minimum phase, b1 of attenuator 402a is used to adjust a notch depth and b2 of attenuator 402b is used to compensate for frequency response.

All publications and patent applications cited in this specification are herein incorporated by reference as if each individual publication or patent application were specifically and individually indicated to be incorporated by reference.

Figure 6:
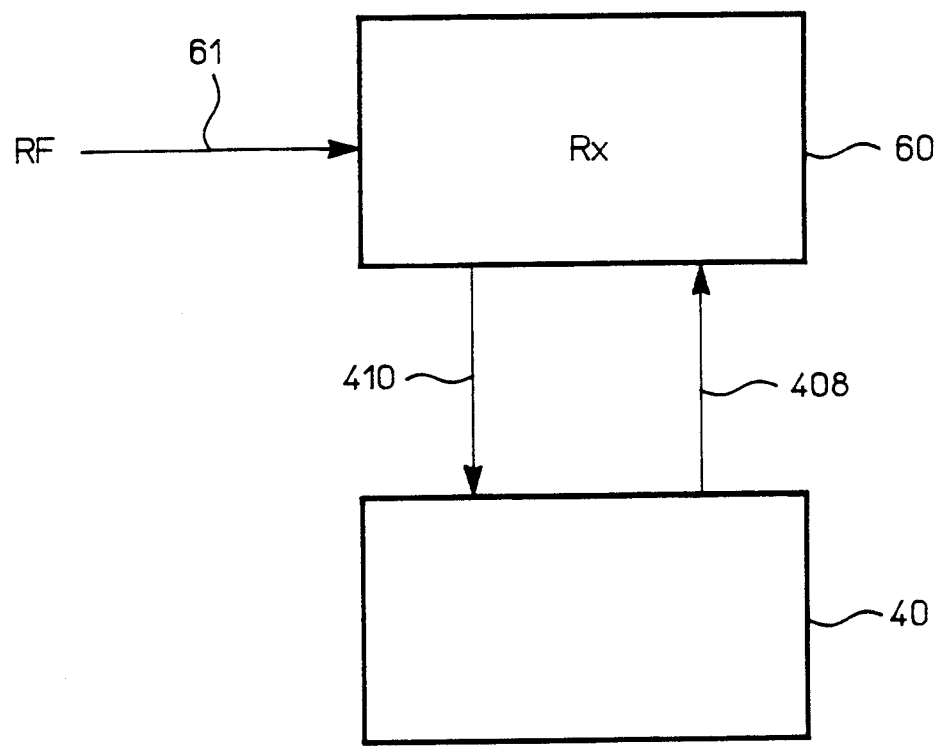
FIG. 6 is a block diagram depicting one embodiment of a multi-path fitting simulator constructed in accordance with the teachings of this invention utilized in conjunction with a receiver.

FIG. 6 is a diagram depicting the use of a multi-path fading simulator 40 constructed in accordance with the teachings of this invention utilized in conjunction with receiver 60. Receiver 60 receives RF input on lead 61, and provides an IF signal to fading simulator 40 on lead 410. Fading simulator 40 provides IF, including simulated fading, for reinjection into receiver 60 via lead 408.

Figure 7:
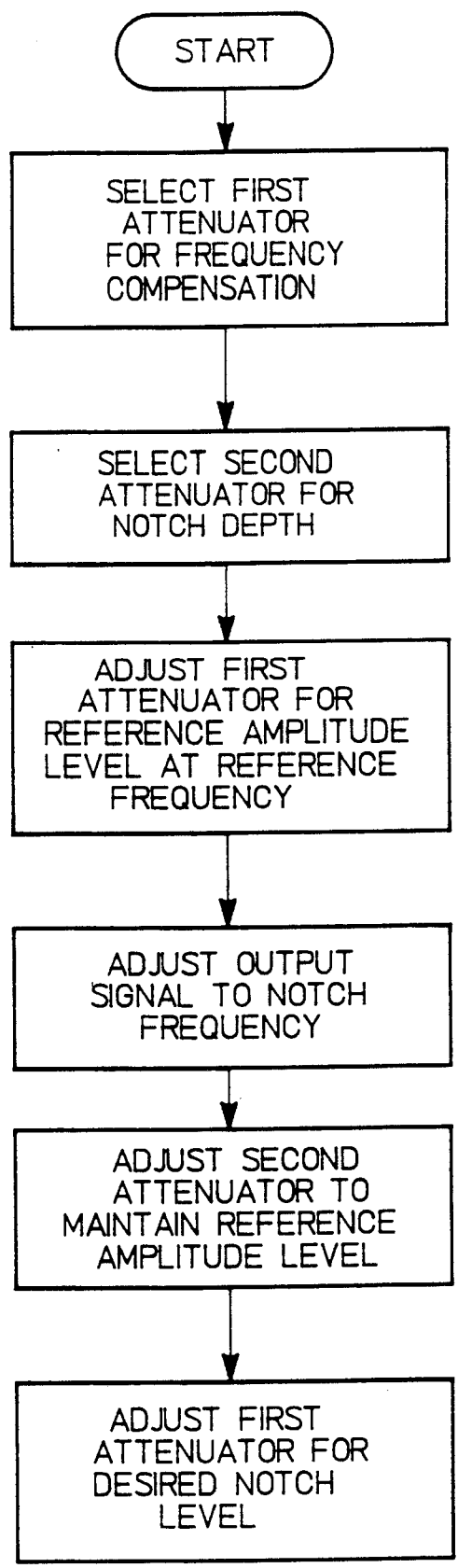
FIG. 7 is a flow chart depicting the operation of one embodiment of this invention.

FIG. 7 is a flow chart depicting the operation of one embodiment of this invention such that attenuators are set to provide a desired signal amplitude and notch step.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. A multi-path distortion simulator for use with a radio receiver being supplied an RF test signal modulated with information free from multi-path fading, said radio receiver having an IF portion, said simulator comprising:
    an input terminal coupled to said IF portion of said receiver for receiving as an input signal the IF signal as generated by said receiver, said input signal including information contained within said RF test signal and being free from multi-path fading;
    an output terminal coupled to said IF portion of said receiver for providing a modified IF signal including simulated multi-path distortion as an output signal for reinjection into said IF portion of said receiver;
    a first signal path comprising an input lead, an output lead, a first phase shifter, and a first attenuator;
    a second signal path comprising an input lead, and output lead, a second phase shifter, a second attenuator, and a delay means;
    a first means for coupling said input terminal to said input leads of said first and second signal paths; and
    a second means for coupling said output leads of said first and second signal paths to said output terminal.

2. A multi-path distortion simulator as in claim 1 wherein said first means for coupling comprises a 0 degree splitter.

3. A multi-path distortion simulator as in claim 1 wherein said first means for coupling comprises a 0 degree splitter and an inverter.

4. A multi-path distortion simulator as in claim 1 wherein said first means for coupling comprises a 180 degree splitter.

5. A multi-path distortion simulator as in claim 1 wherein said second means for coupling comprises a combiner.

6. A multi-path distortion simulator as in claim 1 wherein said first and second phase shifters are closely matched so that any drift or phase shift errors are cancelled.

7. A multi-path distortion simulator as in claim 6 wherein the phase shift provided by said first and second phase shifters are equal in magnitude and opposite in sign.

8. A multi-path distortion simulator as in claim 1 wherein said first and second attenuators are closely matched so that any drift or attenuation errors are cancelled.

9. A multi-path distortion simulator as in claim 1 wherein the frequency of a notch is set by the phase shift provided by said first and second phase shifters.

10. A multi-path distortion simulator as in claim 9 wherein one of said first and second attenuators is used to set a specified notch depth as a function of said frequency of said notch, and the other of said first and second attenuators is used to set a desired notch depth.

11. A multi-path distortion simulator as in claim 1 wherein said input signal comprises a radio frequency signal modulated with test data.

12. A multi-path distortion simulator as in claim 11 wherein said output signal comprises a radio frequency signal modulated with test data and impressed with simulated multi-path distortion.

13. A multi-path distortion simulator as in claim 12 wherein said output signal is suitable for use as an IF signal of a radio.

14. A multi-path distortion simulator as in claim 11 wherein said input signal comprises the IF signal from a radio under test which is receiving an RF signal which is modulated with test data.

15. A multi-path distortion simulator as in claim 14 wherein said output signal comprises a radio frequency signal modulated with test data and impressed with simulated multi-path distortion.

16. A multi-path distortion simulator as in claim 15 wherein said output signal is suitable for reinjection into said radio receiver under test as an IF signal.

17. A multi-path distortion simulator as in claim 1 wherein one of said first and second attenuators serves to compensate for frequency response of said output signal, and the other of said first and second attenuators serves to control the depth of a notch provided in said output signal.

18. A method for using a multi-path distortion simulator with a radio receiver being supplied an RF test signal modulated with information free from multi-path fading, having an IF portion, said simulator comprising:
    an input terminal coupled to said IF portion of said receiver for receiving as an input signal the IF signal as generated by said receiver, said input signal including information contained within said RF test signal and being free from multi-path fading;

an output terminal coupled to said IF portion of said receiver for providing a modified IF signal including simulated multi-path distortion as an output signal for reinjection into said IF portion of said receiver;

a first signal path comprising an input lead, an output lead, a first phase shifter, and a first attenuator;

a second signal path comprising an input lead, and output lead, a second phase shifter, a second attenuator, and a delay means;

a first means for coupling said input terminal to said input leads of said first and second signal paths; and a second means for coupling said output leads of said first and second signal paths to said output terminal;

said method comprising the steps of:

selecting a first one of said first and second attenuators to compensate for frequency response of said output signal;

selecting the other of said first and second attenuators to set the depth of a notch in said output signal independently of the frequency of said notch;

adjusting said first one of said attenuators to provide a reference amplitude level of said output signal at a reference frequency of said output signal;

adjusting said output signal to a desired notch frequency;

adjusting said second one of said attenuators to maintain said reference amplitude level of said output signal; and adjusting said first one of said attenuators to provide a desired notch level of said output signal at said desired frequency.

* * * * *